(12) United States Patent
Matsunaga et al.

(10) Patent No.: US 8,607,748 B2
(45) Date of Patent: Dec. 17, 2013

(54) ENGINE EQUIPPED WITH VARIABLE VALVETRAIN

(75) Inventors: Ayatoshi Matsunaga, Okazaki (JP);
Shinichi Murata, Okazaki (JP);
Daisuke Yoshika, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/393,047

(22) PCT Filed: Dec. 20, 2010

(86) PCT No.: PCT/JP2010/072885
§ 371 (c)(1),
(2), (4) Date: Feb. 28, 2012

(87) PCT Pub. No.: WO2011/086815
PCT Pub. Date: Jul. 21, 2011

(65) Prior Publication Data
US 2012/0152192 A1    Jun. 21, 2012

(30) Foreign Application Priority Data
Jan. 14, 2010 (JP) .................................. 2010-005854

(51) Int. Cl.
*F01L 1/34* (2006.01)
*F01M 1/06* (2006.01)

(52) U.S. Cl.
USPC ................... 123/90.15; 123/90.17; 123/90.34

(58) Field of Classification Search
USPC ............. 123/90.15–90.17, 90.6, 90.31, 90.27
See application file for complete search history.

(56) References Cited

U.S. PATENT DOCUMENTS

| 4,762,097 A | 8/1988 | Baker |
| 2009/0145386 A1 | 6/2009 | Ushida |

FOREIGN PATENT DOCUMENTS

| JP | 2-52946 U | 4/1990 |
| JP | WO 91/05941 A1 | 5/1991 |
| JP | 7-189632 A | 7/1995 |
| JP | 1 111 200 A2 | 6/2001 |
| JP | 2005-180340 A | 7/2005 |
| JP | 2009-144521 A | 7/2009 |

OTHER PUBLICATIONS

Japanese Office Action issued in Japanese Patent Application No. 2011-549891 on May 9, 2012.
European Search Report issued in European Patent Application No. 10843169.3 on May 17, 2013.

*Primary Examiner* — Thomas Denion
*Assistant Examiner* — Steven D Shipe
(74) *Attorney, Agent, or Firm* — Birch, Stewart, Kolasch & Birch, LLP

(57) ABSTRACT

In an engine equipped with a variable valvetrain including a second cam phase alteration mechanism 31 for altering the phase of second intake cams 12 actuating second intake valves, relative to a crankshaft, the second cam phase alteration mechanism 31 is arranged at an end opposite to an end at which a cam sprocket is provided to receive power from the crankshaft, to be located outside a cylinder head 2, and an actuator cover 40 is fixed to the cylinder head 2 to cover at least a lower portion of the second cam phase alteration mechanism 31.

19 Claims, 10 Drawing Sheets

A-A CROSS SECTION

B-B CROSS SECTION

B-B CROSS SECTION

ENGINE EQUIPPED WITH VARIABLE VALVETRAIN

TECHNICAL FIELD

This invention relates to an engine equipped with a cam phase alteration mechanism capable of altering the cam phase.

BACKGROUND ART

In recent years, an increasing number of engines are equipped with a cam phase alteration mechanism constituting a variable valvetrain which can alter the valve open/close timing (cam phase). Further, there has been developed a technique of using such cam phase alteration mechanism in an engine having plural valves for each cylinder to alter the open/close timing of only one or some of the plural valves, depending on operating conditions of the engine.

The camshaft used in such engine valvetrain is constructed by fitting separate cams to a shaft member in a manner allowing the cams to rotate relative to the shaft member. The cam phase alteration mechanism, for example in the form of a hydraulic actuator such as a vane actuator, is arranged at an end of the camshaft to alter the phase offset of some of the cams relative to the shaft member, thereby altering the split, or phase offset of some of the valves relative to the other valves (see patent document 1).

PRIOR ART DOCUMENT

Patent Document

Patent document 1: Japanese Patent Application Laid-open No. 2009-144521 Publication

SUMMARY OF THE INVENTION

Problem to be Solved by the Invention

Generally, the camshaft is arranged within the cylinder head of an engine. The cylinder head is wholly open at the top in consideration of assembly and maintenance of a valvetrain including the camshaft, and a cylinder head cover is detachably fixed on top of the cylinder head by using bolts to cover the open top of the cylinder head.

If the valvetrain includes a cam phase alteration mechanism as seen in patent document 1, the valvetrain as a whole has an increased axial size compared with conventional engines not having a cam phase alteration mechanism. This entails a need to prepare a new cylinder head with an increased axial size to allow the valvetrain including the cam phase alteration mechanism to be arranged therein.

The need for a cylinder head with an increased axial size may entail a problem that the manufacture thereof requires machining equipment of larger size. Further, if the size of the engine cylinder head greatly varies depending on whether the cam phase alteration mechanism is provided or not, it leads to difficulties in manufacturing both types of cylinder heads on the same manufacturing line, which in turn leads to reduced productivity or excessive additional equipment investment.

An object of the present invention is to provide an engine equipped with a variable valvetrain including a cam phase alteration mechanism which does not entail a significant increase in cylinder head size.

Means for Solving the Problem

In order to achieve this object, the invention recited in claim 1 is an engine equipped with a variable valvetrain including a cam phase alteration mechanism attached to a camshaft to alter the phase of a valve-actuating cam fitted to the camshaft relative to a crankshaft, the camshaft being arranged to rotate by receiving power transmitted from the crankshaft to a first end of the camshaft, wherein the cam phase alteration mechanism is arranged at a second end of the camshaft opposite to the first end to be located outside a cylinder head, and the engine comprises a cover member fixed to the cylinder head to cover at least a lower portion of the cam phase alteration mechanism.

In the invention recited in claim 2, the cam phase alteration mechanism is a hydraulic actuator, and a control valve for controlling supply and discharge of a hydraulic oil to and from the cam phase alteration mechanism is fixed to the cover member.

In the invention recited in claim 3, the cylinder head and the cover member are open at the top, the cover member is arranged with its open top flush with the open top of the cylinder head, and the engine comprises a cylinder head cover arranged to cover the open top of the cylinder head and the open top of the cover member.

In the invention recited in claim 4, a detection means for detecting the phase of the cam subjected to phase alteration control performed through the cam phase alteration mechanism is fitted to the cover member.

In the invention recited in claim 5, an oil drain passage for draining the control valve extends into the cylinder head.

In the invention recited in claim 6, a wall separating a space inside the cover member and a space inside the cylinder head has an oil passage connecting the space inside the cover member and the space inside the cylinder head.

In the invention recited in claim 7, the cam phase alteration mechanism has a cylindrical outer shape and is arranged coaxially with the camshaft, and the cover member has an arc-shaped inner wall surface extending along the outer circumference of the cam phase alteration mechanism.

In the invention recited in claim 8, the cover member has a guide means provided at the inner wall surface to guide the hydraulic oil from the space inside the cover member to the oil passage as the cam phase alteration mechanism rotates.

In the invention recited in claim 9, the cover member is open at the top and has an interior space in the shape of a half cylinder to cover a lower half of the cam phase alteration mechanism, and the cylinder head cover has an arc-shaped inner wall surface extending along the outer circumference of the cam phase alteration mechanism and covers the open top of the cover member.

In the invention recited in claim 10, the cover member is a member separate from the cylinder head and fixed to the cylinder head.

In the invention recited in claim 11, the cam phase alteration mechanism is provided at either end of the camshaft rotatably supported by plural bearings formed integrally with the cylinder head, two oil paths for supplying the hydraulic oil to the two cam phase alteration mechanisms at the opposite ends of the camshaft each include a passage formed in the cylinder head and a passage formed in the camshaft, the passages in the cylinder head constituting the two oil paths extend in different ones of the bearings and connect to their corresponding oil passages in the camshaft, one of the two oil paths supplying the hydraulic oil to a first one of the two cam phase alteration mechanisms includes an annular groove formed in the outer circumferential surface of the camshaft, and the other of the two oil paths supplying to a second one of the two cam phase alteration mechanisms includes an annular groove formed in the inner circumferential surface of the bearing.

In the invention recited in claim 12, the engine has a plurality of intake valves for each cylinder, the first one of the two cam phase alteration mechanisms is provided to alter the phase of all the intake valves, and the second one of the two cam phase alteration mechanisms is provided to alter the phase of some of the intake valves.

In the invention recited in claim 13, the bearing having the oil passage constituting the oil path for supplying the hydraulic oil to the second one of the two cam phase alteration mechanisms is greater in inside diameter than the bearing having the oil passage constituting the oil path for supplying the hydraulic oil to the first one of the two cam phase alteration mechanisms.

Effect of the Invention

In the invention recited in claim 1, the cam phase alteration mechanism is arranged outside the cylinder head and inside the cover member; the cylinder head does not need to hold the cam phase alteration mechanism inside. This engine therefore does not entail a significant increase in cylinder head size, although equipped with a variable valvetrain including a cam phase alteration mechanism. This enables a reduction in size of cylinder-head machining equipment, and allows the engine equipped with a cam phase alteration mechanism to have a cylinder head of substantially the same shape as that of engines without a cam phase alteration mechanism, and thus, share cylinder-head machining equipment with the latter type of engines, leading to reduced equipment costs.

Further, the engine having the above-described structure allows cam holes for receiving a camshaft to be formed by boring in the manufacture of the cylinder head, and thus, facilitates machining and provides increased accuracy of cam holes, which leads to reduced friction between the rotating camshaft and the cam holes.

Further, when the cam phase alteration mechanism is a hydraulic actuator and a hydraulic oil supply path to the cam phase alteration mechanism extends across the sliding-contact surfaces of a bearing with a cam hole and a camshaft, the increased accuracy of the cam hole leads to reduced oil leakage between the sliding-contact surfaces and improved response of the cam phase alteration mechanism.

Further, arranging the cam phase alteration mechanism in a space separated from the cylinder head prevents a lubricant, which is present in a large quantity inside the cylinder head, from being stirred by the rotating actuator. This reduces the resistance exerted by the lubricant on the rotating actuator, and reduces such portion of the lubricant that turns into a mist and becomes mixed in with blow-by, and thus, does not have an adverse effect on oil consumption.

In the invention recited in claim 2, the control valve for controlling supply and discharge of a hydraulic oil to and from the cam phase alteration mechanism is fixed to the cover member. Thus, work involved in fitting the control valve, such as deburring and cleaning, is performed solely on the cover member smaller in size than the cylinder head, leading to reduced machining costs. Further, arranging the control valve near the actuator ensures satisfactory response of the actuator.

In the invention recited in claim 3, the cylinder head cover is designed to cover both the open top of the cylinder head and the open top of the cover member, leading to a reduced number of components. Further, the cylinder head cover, attached to the cylinder head and the cover member in the same plane, can satisfactorily seal the cylinder head and the cover member.

In the invention recited in claim 4, the detection means for detecting the phase of the cam subjected to phase alteration control performed through the cam phase alteration mechanism is fitted to the cover member. Thus, work involved in fitting those components which are required when the cam phase alteration mechanism is provided is performed solely on the cover member, leading to reduced machining costs.

In the invention recited in claim 5, the oil drain passage for draining the control valve extends into not the space inside the cover member but the cylinder head. This keeps down an increase in the hydraulic oil inside the cover member, thus reducing the friction which the operating cam phase alteration mechanism experiences.

In the engine equipped with the variable valvetrain recited in claim 6, the cam phase alteration mechanism is arranged inside the cover member. The hydraulic oil possibly leaking from the cam phase alteration mechanism is thus prevented from leaking out. Since the wall separating a space inside the cover member and a space inside the cylinder head has an oil passage connecting both spaces, the hydraulic oil leaking from the cam phase alteration mechanism into the space inside the cover member is drained from the cover member into the space inside the cylinder head. This reduces the amount of the hydraulic oil staying inside the cover member, and thus, reduces the friction between the operating cam phase alteration mechanism and the hydraulic oil, which is stirred inside the cover member, and improves the response of the cam phase alteration mechanism.

In the engine equipped with the variable valvetrain recited in claim 7, the cover member has an arc-shaped inner wall surface extending along the outer circumference of the cam phase alteration mechanism. This allows the hydraulic oil possibly staying inside the cover member to be smoothly stirred by the rotating cam phase alteration mechanism, and thus, keeps down an increase in friction. Further, smooth stirring of the hydraulic oil reduces aeration, and thus, when the hydraulic oil is recovered from the cover member and reused in the cam phase alteration mechanism, it does not exhibit a significant decrease in pressure due to aeration, and thus, the cam phase alteration mechanism does not exhibit a significant deterioration in responsiveness. Further, the arc shape of the cover member leads to a reduced size, and thus, a compact design thereof.

In the engine equipped with the variable valvetrain recited in claim 8, the guide member guides the hydraulic oil, which is stirred inside the cover member by the rotating cam phase alteration mechanism, to the oil passage, and thus, helps the hydraulic oil be smoothly drained through the oil passage. The hydraulic oil staying inside the cover member is thus quickly drained, resulting in a quick reduction in resistance exerted on the cam phase alteration mechanism by the hydraulic oil.

In the engine equipped with the variable valvetrain recited in claim 9, the cylinder head cover and the cover member together cover the entire circumference of the cam phase alteration mechanism with a relatively small clearance. This provides a structure for holding the cam phase alteration mechanism which is simple, reduced in overall size, and does not entail the hydraulic oil staying inside in a significant quantity.

In the engine equipped with the variable valvetrain recited in claim 10, the cover member provided to hold the cam phase alteration mechanism inside is a member separate from the cylinder head. This allows the cylinder head to be designed such that most of its portions have the same dimensions as the corresponding portions of the cylinder head for engines not requiring the cam phase alteration mechanism.

In the engine equipped with the variable valvetrain recited in claim 11, the oil path for supplying the hydraulic oil to the first cam phase alteration mechanism includes an annular oil groove formed in the outer circumferential surface of the rotating camshaft, while the oil path for supplying to the hydraulic oil to the second cam phase alteration mechanism includes an annular oil groove formed in the inner circumferential surface of the stationary bearing. In the annular oil groove formed in the outer circumferential surface of the rotating camshaft, the hydraulic oil rotates by being dragged by the rotating oil groove, and thus, quickly moves past an open end of an oil passage extending into the annular oil groove to constitute the oil path to the first cam phase alteration mechanism. In the annular oil groove formed in the inner circumferential surface of the stationary bearing, only layers of the hydraulic oil nearer to the rotating camshaft rotate by being dragged by the rotating camshaft, and thus, the hydraulic oil slowly moves past an open end of an oil passage extending into the annular oil groove to constitute the oil path to the second cam phase alteration mechanism. This produces a difference between the pressures near the open ends of the passages extending into the two annular oil grooves. Specifically, the oil pressure near the open end of the passage constituting the oil path to the second cam alteration mechanism is lower than the pressure near the open end of the passage constituting the oil path to the first cam alteration mechanism, leading to ease of the hydraulic oil's being supplied to the annular oil groove constituting the former oil path. The hydraulic oil thus more easily flows into the second cam alteration mechanism than the first cam phase alteration mechanism, or in other words, the second cam phase alteration mechanism is supplied with the hydraulic oil in preference to the first cam phase alteration mechanism, so as to be activated quickly.

In the engine equipped with the variable valvetrain recited in claim 12, phase alteration of some of the intake valves by means of the second cam phase alteration mechanism takes place in preference to phase alteration of all the intake valves by means of the first cam phase alteration mechanism. This ensures that, for example when low-speed low-load operation of the engine entails a reduction in supply of the hydraulic oil from the oil pump, alteration of so-called intake-valve split by means of the second cam phase alteration mechanism is effected preferentially and quickly to optimize the cam timing without delay as required to improve fuel efficiency while maintaining high drivability.

In the engine equipped with the variable valvetrain recited in claim 13, the bearing having the oil passage constituting the oil path to the second cam phase alteration mechanism is greater in inside diameter than the bearing having the oil passage constituting the oil path to the first cam phase alteration mechanism. This results in a greater circumferential velocity of the hydraulic oil in the oil groove into which the former oil passage extends, leading to a reduced likelihood of increase in oil pressure near the open end of the former oil passage. Thus, if it is designed such that the so-called intake-valve split alteration is effected by means of the second cam phase alteration mechanism, the intake-valve split alteration is effected preferentially and quickly. This provides increased design freedom, and thus, makes it possible to increase strength reliability, while maintaining high drivability and high fuel efficiency. This also makes it possible to balance the responsivenesses of the two cam phase alteration mechanisms provided at the opposite ends of the camshaft.

MODE OF CARRYING OUT THE INVENTION

Figure 1:
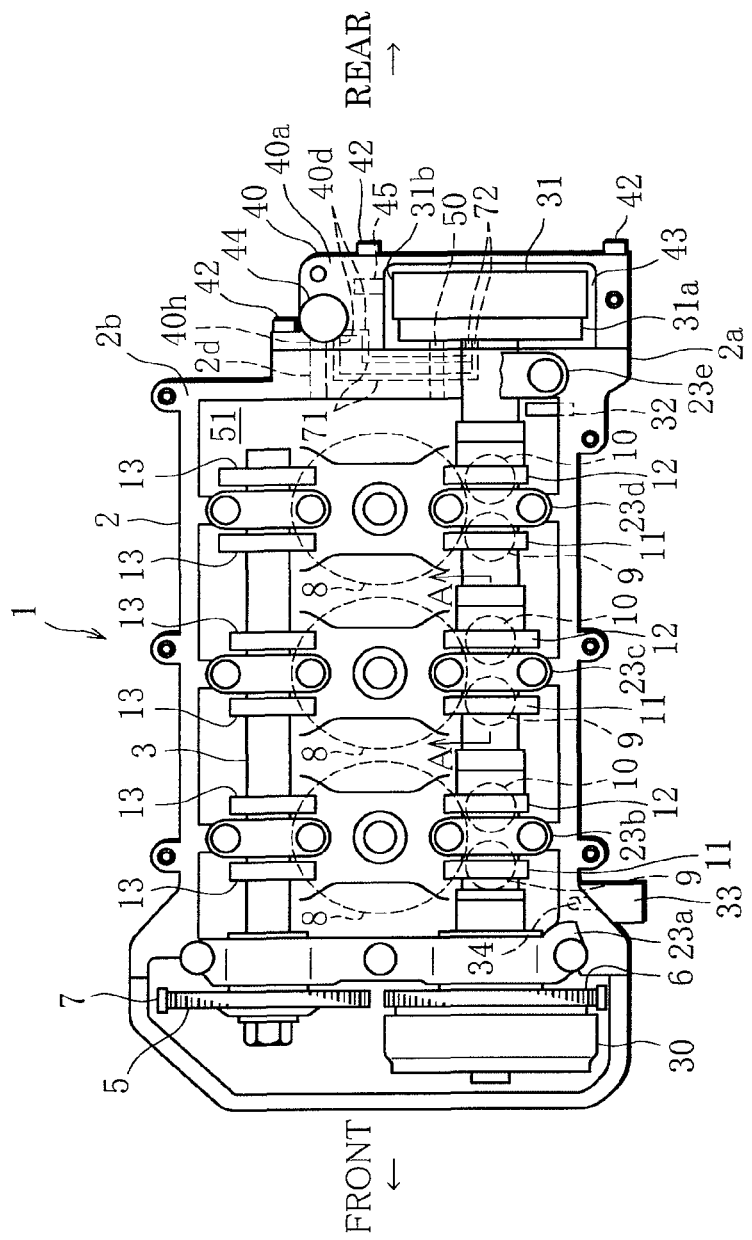
FIG. 1 is a top view showing a configuration inside a cylinder head in an embodiment of engine equipped with a variable valvetrain.

Referring to the drawings attached, an embodiment of the present invention will be described below.

Figure 2:
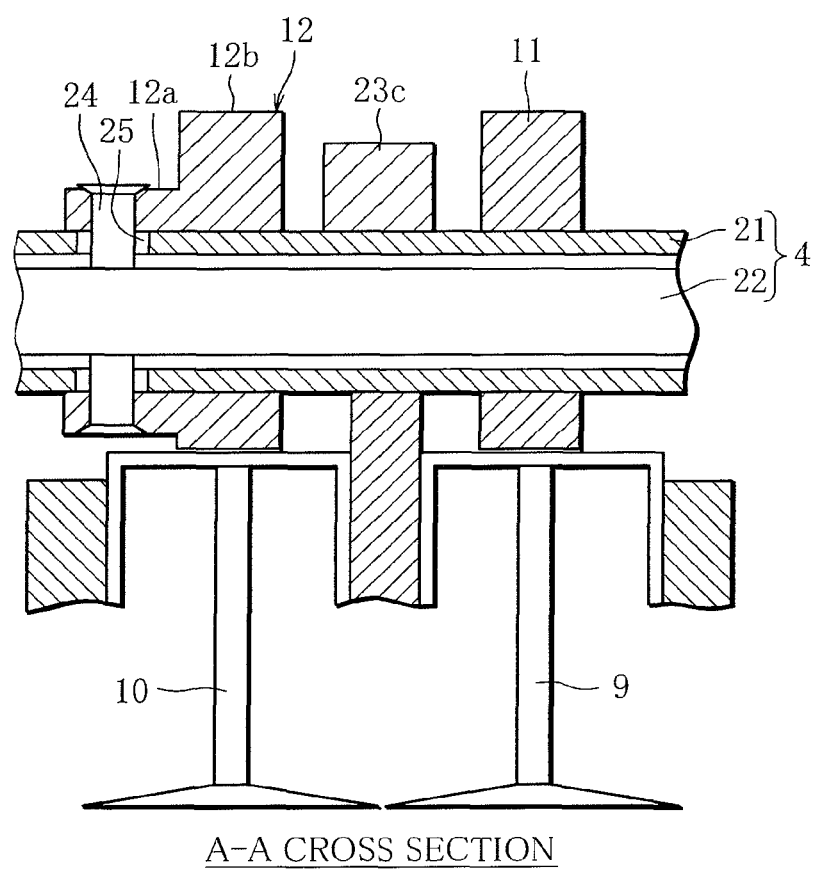
FIG. 2 is a cross-sectional view showing the structure of an intake camshaft.

FIG. 1 is a top view showing a configuration inside a cylinder head 2 in an embodiment of engine equipped with a variable valvetrain (hereinafter referred to simply as "engine 1"), and FIG. 2 is a cross-sectional view showing the structure of an intake camshaft 4.

This embodiment of engine 1 is an in-line three-cylinder engine equipped with a DOHC valvetrain. As seen in FIG. 1, an exhaust camshaft 3 and an intake camshaft 4 ("camshaft" in claims), rotatably supported inside the cylinder head 2, have cam sprockets 5, 6 attached thereto, respectively. The cam sprockets 5, 6 are connected to a crankshaft, not shown, by a chain 7.

For each cylinder 8 of the engine 1, two intake valves 9, 10 and two exhaust valves, not shown, are provided. The intake camshaft 4 has alternately-arranged first and second intake cams 11, 12, and the two intake valves 9, 10 for each cylinder are actuated by a first and a second intake cams 11, 12, respectively. In other words, the first intake valves 9 are actuated by the first intake cams 11 and the second intake valves 10 by the second intake cams 12. The exhaust valves are actuated by exhaust cams 13 fixed to the exhaust camshaft 3.

As seen in FIG. 2, the intake camshaft 4 is a double-structured shaft consisting of a hollow outer camshaft 21 and an inner camshaft 22 inserted in the outer camshaft 21. The inner camshaft 22 is coaxially arranged inside the outer camshaft 22 with a slight clearance. The inner and outer camshafts thus arranged are rotatably supported by bearings 23a to 23e formed integrally with the cylinder head 2 of the engine 1.

Each first intake cam 11 is fixed to the outer camshaft 21. Each second intake cam 12 ("valve-actuating cam" in claims) is rotatably seated on the outer camshaft 21. Each second intake cam 12 includes an approximately cylindrical support portion 12a allowing the outer camshaft 21 to pass through and a cam projection portion 12b projecting radially outward from the support portion 12a to actuate the associated second intake valve 12. Each second intake cam 12 is fixed to the inner camshaft 22 by a pin-shaped member 24 extending through the support portion 12a of the second intake cam 12, the outer camshaft 21 and the inner camshaft 22. The pin-shaped member 24 is fitted in a hole in the inner camshaft 22 with practically no clearance and fastened to the support portion 12a with a retaining portion at either end. The outer camshaft 21 has circumferentially-extending elongated holes 25 each allowing a pin-shaped member 24 to pass through. Consequently, the first intake cams 11 rotate with the outer camshaft 21 to actuate the associated first intake valves, while the second intake cams 12 rotate with the inner camshaft 22 to actuate the associated second intake valves.

As seen in FIG. 1, the intake camshaft 4 is equipped with a first cam phase alteration mechanism 30 and a second cam phase alteration mechanism 31. The first and second cam phase alteration mechanisms 30, 31 are known vane hydraulic actuators, for example. The vane hydraulic actuator comprises a vaned rotor rotatably arranged inside a cylindrical housing (cover), and designed such that the angular offset of the vanes relative to the housing varies depending on supply of a hydraulic oil into the housing.

The first cam phase alteration mechanism 30 is arranged at the front end of the intake camshaft 4. Specifically, the housing of the first cam phase alteration mechanism 30 is joined to the cam sprocket 6, and the vaned rotor of the first cam phase alteration mechanism 30 is joined to the front end of the outer camshaft 21.

The second cam phase alteration mechanism 31 is arranged at the rear end of the intake camshaft 4. Specifically, the housing 31a of the second cam phase alteration mechanism 31 is joined to the rear end of the outer camshaft 21, and the vaned rotor of the second cam phase alteration mechanism 31 is joined to the inner camshaft 22 with the second intake cams 12 fixed to.

Thus, the first cam phase alteration mechanism 30 can alter the angular offset of the outer camshaft 21 relative to the cam sprocket 6, while the second cam phase alteration mechanism 31 can alter the angular offset of the inner camshaft 22 relative to the outer camshaft 21. Accordingly, the first cam phase alteration mechanism 30 can alter the open/close timing of all the first and second intake valves 9, 10 relative to the open/close timing of the exhaust valves, while the second cam phase alteration mechanism 31 can alter the open/close timing of the second intake valves 10 relative to the open/close timing of the first intake valves 11. This function of the second cam phase alteration mechanism is called split alteration.

To the cylinder head 2, a first cam sensor 32 for detecting actual angular offset of the outer camshaft 21, and a first OCV (oil control valve) 33 for controlling supply and discharge of the hydraulic oil to and from the first cam phase alteration mechanism 30 are fitted. The first OCV 33 is arranged near the first cam phase alteration mechanism 30. The hydraulic oil is supplied by an oil pump, not shown, fixed to the cylinder block of the engine 1 via an oil passage 34 vertically extending in the wall of the cylinder head 2. The first cam sensor 32 is used in control performed through the first OCV 33, or control of the operation of the first cam phase alteration mechanism 30.

In this embodiment of engine 1, it is particularly noteworthy that the intake camshaft 4 extends through the rear wall 2a of the cylinder head 2 so that the second cam phase alteration mechanism 31 arranged at its rear end is located outside the cylinder head 41. The rear wall 2a of the cylinder head 2 includes a bearing 23e to support the intake camshaft 4 near the rear end.

Figure 3:
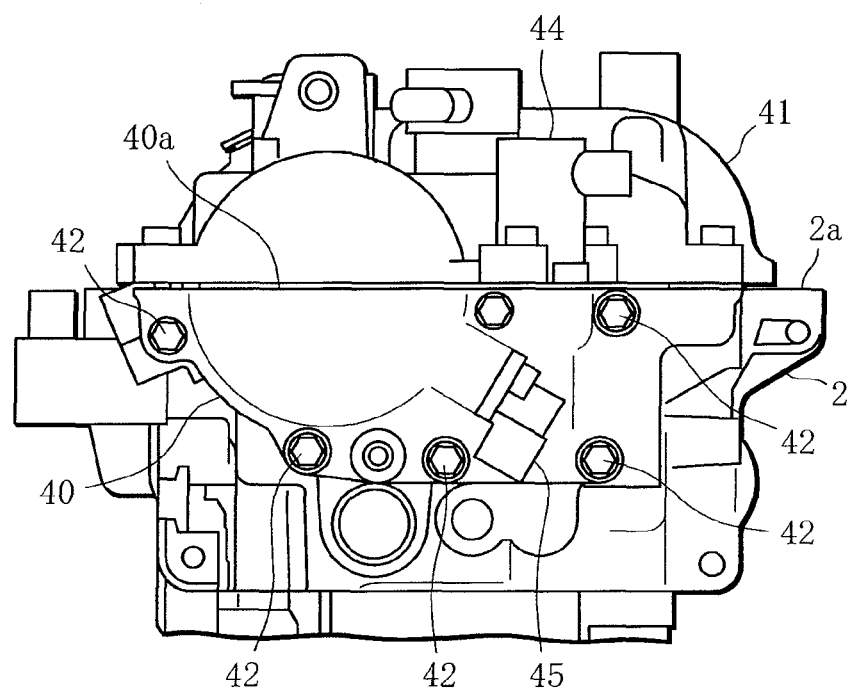
FIG. 3 is a rear view of the engine showing how an actuator cover and a cylinder cover are attached.
Figure 4:
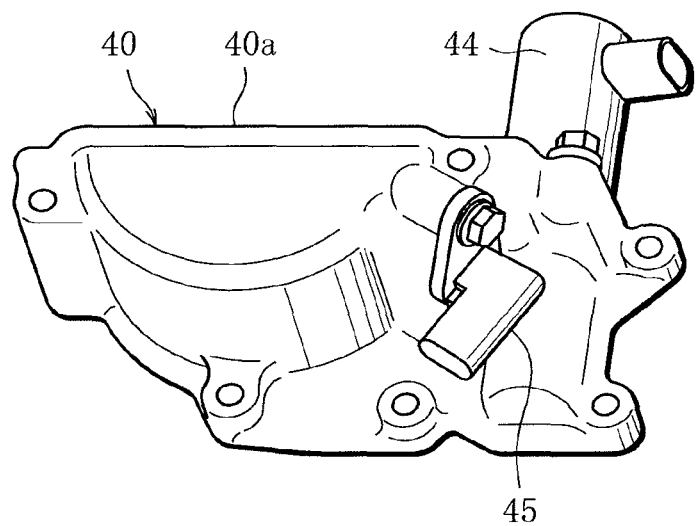
FIG. 4 is a perspective view showing the outer shape of the actuator cover.
Figure 5:
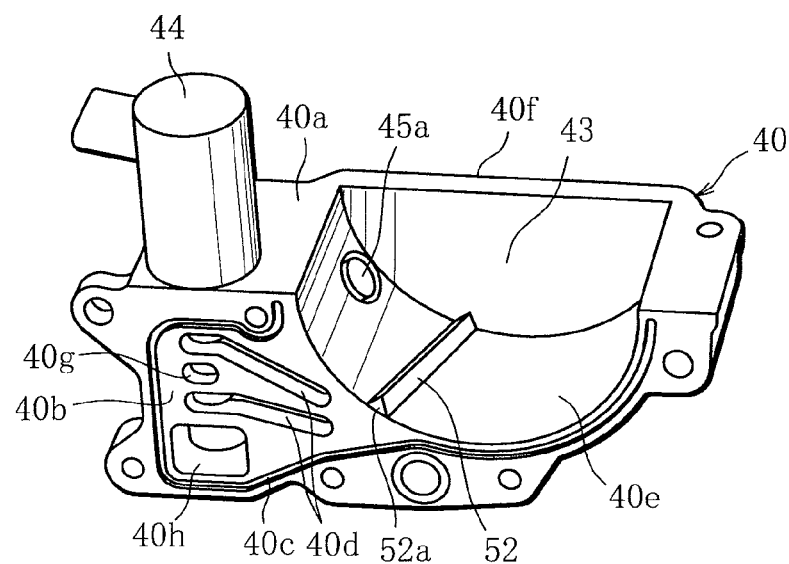
FIG. 5 is a perspective view showing the inner structure of the actuator cover.

FIG. 3 is a rear view of the engine 1 showing how an actuator cover 40 and a cylinder head cover 41 are attached, FIG. 4 a perspective view showing the outer shape of the actuator cover 40, and FIG. 5 a perspective view showing the inner structure of the actuator cover 40.

As seen in FIGS. 1 and 3 to 5, the actuator cover 40 ("cover member" in claims) is fixed to the cylinder head 2 by bolts 42. When fixed to the cylinder head 4, the actuator cover 40 covers the lower half of the second cam phase alteration mechanism 31 having a cylindrical outer shape, with a slight clearance.

The actuator cover 40 is open at the top, and fixed to the cylinder head 2 with its top 40a flush with the top 2b of the cylinder head 2. The cylinder head cover 41 covering the top of the cylinder head 2 projects rearward beyond the cylinder head 2 to cover also the top of the actuator cover 40. Thus, the actuator cover 40 and part of the cylinder head cover 41 define a space 43 for the second cam phase alteration mechanism 31 to be arranged in.

The surface 40b of the actuator cover 40 which is to meet the cylinder head 2 has a seal groove 40c to receive a rubber seal to prevent oil leak from the interior space 43.

To the actuator cover 40, a second OCV ("control valve" in claims) 44 for controlling supply and discharge of the hydraulic oil to and from the second cam phase alteration mechanism 31, and a second cam sensor 45 ("detection means" in claims) for detecting the timing of rotation of the vaned rotor of the second cam phase alteration mechanism 31 are fitted.

To the second OCV 44, the hydraulic oil is supplied via an oil passage formed in the cylinder head 2, not shown, and an oil passage 40g formed in the actuator cover 40. From the second OCV 44, the hydraulic oil is supplied to the second cam phase alteration mechanism 31 via an oil passage 40d formed in the actuator cover 40, an oil passage 71 formed in the cylinder head 2 and an oil passage 72 formed in the outer camshaft 21. The hydraulic oil drained from the second OCV 44 is returned into the cylinder head 2 via an oil drain passage 40h formed in the actuator cover 40 and an oil drain passage 2d formed in the rear wall 2a of the cylinder head 2.

The second cam sensor 45 is fitted to the actuator cover 40 to face a surrounding wall 31b of the second cam phase alteration mechanism 31a joined to the vaned rotor. The second cam sensor detects actual angular offset of the surrounding wall, and thus, of the inner camshaft 22.

The second cam sensor 45 can therefore detect actual angular offset between the outer camshaft 21 and the inner camshaft 22 from the actual angular offset of the inner camshaft detected by itself and the actual angular offset of the outer camshaft 21 detected by the first cam sensor 32. This actual angular offset between the outer and inner camshafts is used in control performed through the second OCV 44, or control of the operation of the second cam phase alteration mechanism 31.

The second cam sensor 45 has a detection surface 45a located somewhat above the bottom of the space 43 inside the actuator cover 40. This provides an advantage that, for example iron powder possibly entering the space 43 is unlikely to stay in front of the detection surface 45a, resulting in a reduced possibility of the second cam sensor 45's making false detection.

Figure 6:
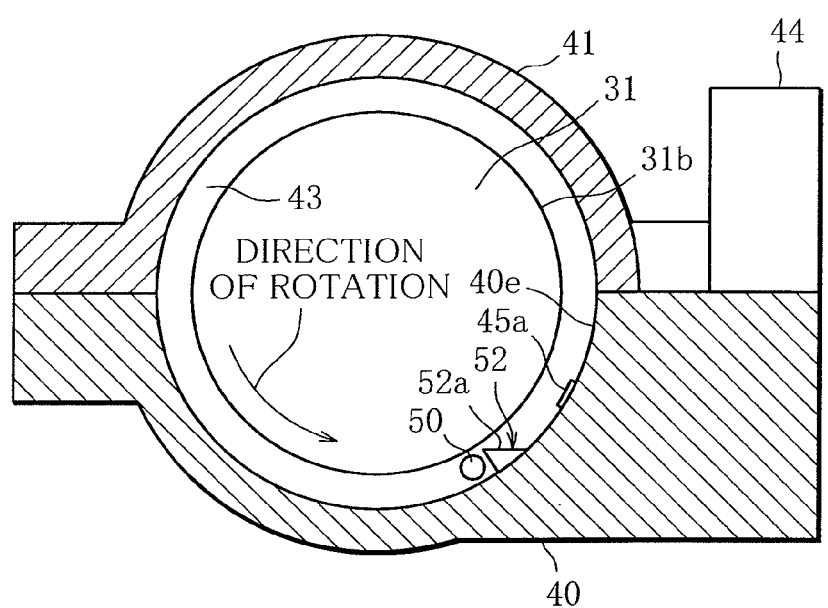
FIG. 6 is a cross-sectional view showing how a dam is provided at the actuator cover.

FIG. 6 is an explanatory diagram showing the location of an oil passage 50 in the cylinder head 2 and the location of a dam 52 provided at the actuator cover 40.

The rear wall 2a of the cylinder head 2 has an oil passage 50 which connects the space 43 inside the actuator cover 4 and a space 51 inside the cylinder head. As seen in FIG. 6, the oil passage 50 faces the clearance between the inner circumferential wall surface 40e of the actuator cover 40 and the surrounding wall 31b of the second cam phase alteration mechanism 31, at a location a little ahead of the bottom of the clearance in the direction of rotation of the second cam phase alteration mechanism 31.

As seen in FIGS. 5 and 6, the actuator cover 40 has an upward-projecting dam 52 ("guide means" in claims) at the inner circumferential wall surface 40e. The dam 50 has a height determined not to contact the rotating surrounding wall 31b of the second cam phase alteration mechanism 31. The dam 52 slants upward from the rear wall 40f of the actuator cover toward the cylinder 2 with its cylinder head 2-side end being located above the open end of the oil passage 50.

Figure 7:
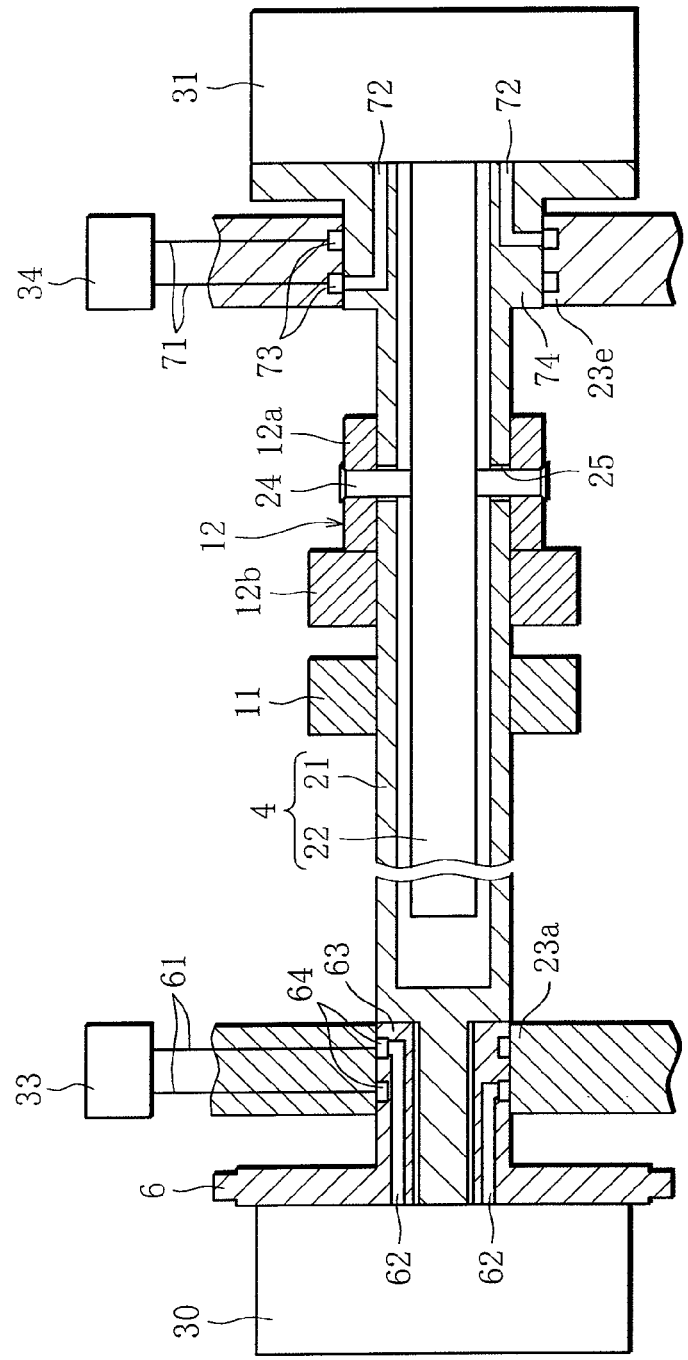
FIG. 7 is a cross-sectional view showing what configuration the intake camshaft and its bearings have.

FIG. 7 is a cross-sectional view showing what configuration the intake camshaft 4 and its bearings have.

As seen in FIG. 7, the hydraulic oil is supplied from the first OCV 33 to the first cam phase alteration mechanism 30 via oil passages 61 in the cylinder head 2 and oil passages 62 in the intake camshaft 4. Annular oil grooves 64 are formed in the outer circumferential surface of a cam journal 63, or part of the intake camshaft 4 in contact with the bearing 23a, and the oil passages 61 have their open ends at the inner circumferential surface of the bearing 23a to face the oil grooves 64, respectively. This allows the corresponding oil passages 61, 62, formed in the bearing 23a and the cam journal 63 being in relative rotation, to always be connected to each other.

Likewise, the hydraulic oil is supplied from the second OCV 34 to the second cam phase alteration mechanism 31 via oil passages 71 in the cylinder head 2 and oil passages 72 in the outer camshaft 21. Unlike the above, annular oil grooves 73 are formed in the inner circumferential surface of the bearing 23e, and the oil passages 72 have their open ends at the outer circumferential surface of a cam journal 74, or part of the intake camshaft 4 in contact with the bearing 23e to face the oil grooves 73, respectively. This allows the corresponding oil passages 71, 72, formed in the bearing 23e and the cam journal 74 being in relative rotation, to always be connected to each other.

In the present embodiment of engine 1, the bearing 23e having the oil passages 71 toward the second cam phase alteration mechanism 31 is greater in inside diameter than the bearing 23a having the oil passages 61 toward the first cam phase alteration mechanism 30.

As described above, in the present embodiment, the second cam phase alteration mechanism 31 for altering the phase offset between the intake valves 9 and 10 is located behind the cylinder head 2, and thus, outside the cylinder head 2, and arranged inside the actuator cover 40, a component separate from the cylinder head 2. This allows the present embodiment of engine 1 to have a cylinder head 2 of substantially the same front-to-back size as that of conventional engines without a second cam phase alteration mechanism 31, and thus, allows the cylinder head 2 machining equipment to have a small size. This also allows the present embodiment of engine 1 to have a cylinder head of substantially the same shape as that of engines without a second cam phase alteration mechanism 31, and thus, share the cylinder head machining equipment with such engines, leading to reduced equipment costs.

Further, the bearing 23e for supporting the intake camshaft 4 near the rear end is formed in the rear wall 2a of the cylinder head 2, which, in the manufacture of the cylinder head 2, allows not only a cam hole for the bearing 23e but also the cam holes for the other bearings 23a to 23d for the intake camshaft 4 to be formed by boring from the rear of the cylinder head 2, and thus, facilitates boring for the bearings 23a to 23e and provides increased accuracy of the cam holes, which leads to reduced friction between the rotating intake camshaft 4 and the cam holes.

Further, since the hydraulic oil paths to the cam phase alteration mechanism 31 extend across the sliding-contact surfaces of the bearing 23e and the cam journal 74, increased accuracy of the cam hole for the bearing 23e leads to reduced leakage of the hydraulic oil between the sliding-contact surfaces, and thus, keeps down a deterioration in responsiveness of the first cam phase alteration mechanism 30.

Further, the cylinder head 41 is designed to cover both the open top of the cylinder head 2 and the open top of the actuator cover 40, leading to a reduced number of components. Further, the top 40a of the actuator cover 40 is flush with the top 2a of the cylinder head 2, which allows the cylinder head cover 41 to be attached with its bottom flush with both tops 40a and 2a, and thus, satisfactorily seal the cylinder head cover 2 and the actuator cover 40.

Further, the second OCV 44 for controlling supply and discharge of the hydraulic oil to and from the second cam phase alteration mechanism 31 is fixed to the actuator cover 40. This means that work involved in fitting the second OCV 44 is performed on not the cylinder head 2 but the actuator cover 40 of a relatively small size, which in turn means that work such as deburring and cleaning can be conducted easily at low costs.

Further, the second cam sensor 45 for detecting the phase offset between the first and second intake cams 11 and 12 or simply the phase of the second intake cams 12 is also fitted to the actuator cover 40. This means that work involved in fitting those peripheral devices which are required when the second cam phase alteration mechanism 31 is provided is performed solely on the actuator cover 40, leading to reduced machining costs.

Further, in the present embodiment, the second cam phase alteration mechanism 31 is arranged in a space 43 inside the actuator cover 40, namely space separated from the space 51 inside the cylinder head 2 by the rear wall 2a. The second cam phase alteration mechanism 31 in the form of a hydraulic actuator is likely to leak the hydraulic oil because of its structure. Even if the hydraulic oil leaks from the second cam phase alteration mechanism 31, however, the actuator cover 40 prevents the hydraulic oil from leaking out. Further, since the space holding the second cam phase alteration mechanism 31 is separated from the space 51 inside the cylinder head 51, a lubricant splashed in the space 51 inside the cylinder head 2 is prevented from entering the space 43 inside the actuator cover 40.

Further, in the present invention, the space 43 inside the actuator cover 40 and the space 51 inside the cylinder head 2 are connected by the oil passage 50. Thus, even if the hydraulic oil leaks from the second cam phase alteration mechanism 31, the leaked hydraulic oil is drained from the space 43 inside the actuator cover 40 to the space 51 inside the cylinder head 2 via the oil passage 50, resulting in a reduced amount of the hydraulic oil staying inside the actuator cover 40.

The oil drain for draining the second OCV 44 extends into not the space 43 inside the actuator cover 40 but the space 51 inside the cylinder head 2. Thus, draining the second OCV 44 does not result in the hydraulic oil's staying inside the actuator cover 40.

Reducing the hydraulic oil staying inside the actuator cover 40 leads to reduced friction between the second cam phase alteration mechanism 31, which rotates with the intake camshaft 4, and the hydraulic oil stirred, and improved response of the second cam phase alteration mechanism 31, and thus, improved response of the second intake valves 10 to phase alteration operation.

Further, the actuator cover 40 has an arc-shaped inner circumferential wall surface 40e extending along the surrounding wall 31b of the second cam phase alteration mechanism 31. This allows the hydraulic oil, which is possibly not satisfactorily drained from the actuator cover 40 and stays therein, to be smoothly stirred by the rotating second cam phase alteration mechanism 31, and thus keeps down an increase in friction. Smooth stirring of the hydraulic oil also reduces aeration, and thus, when the hydraulic oil is recovered from the actuator cover 40 and reused in the second cam phase alteration mechanism 31 or others, it does not exhibit a significant decrease in pressure due to aeration, and thus, the second cam phase alteration mechanism 31 or others does not exhibit a significant deterioration in responsiveness.

Further, the presence of a slight clearance between the inner circumferential wall surface 40e of the actuator cover 40 and the surrounding wall 31b of the second cam phase alteration mechanism 31 serves to reduce the hydraulic oil staying inside the actuator cover 40, and thus, reduce the resistance exerted on the rotating second cam phase alteration mechanism by the hydraulic oil.

Further, the dam 52 provided at the inner circumferential wall surface 40b of the actuator cover 40 guides the hydraulic oil, which is stirred inside the actuator cover 40 by the rotating second cam phase alteration mechanism 31, to the oil passage 50, and thus helps the hydraulic oil be smoothly drained from the actuator cover 40 through the oil passage 50. The hydraulic oil staying inside the actuator cover is thus quickly drained, resulting in a quick decrease in resistance exerted on the rotating cam phase alteration mechanism by the hydraulic oil.

The actuator cover 40 covers the lower half of the second cam phase alteration mechanism 31 and the cylinder head cover 41 covers the upper half thereof, where the actuator cover 31 and the cylinder head cover 41 together cover the entire circumference of the second cam phase alteration mechanism 31 with a relatively small clearance. This provides a structure for holding the second cam phase alteration mechanism 3 which is simple, reduced in overall size, and does not entail the hydraulic oil staying inside in a significant quantity.

If the detection surface 45a of the second cam sensor 45 contains a magnet, there is a possibility that iron powder produced, for example by wearing of the interior of the engine and mixed in with the hydraulic oil sticks to the detection surface 45a and causes the second cam sensor's false detection. The entire circumference of the second cam phase alteration mechanism is however covered with a relatively small clearance, which reduces the amount of the hydraulic oil falling on the detection surface 45a, and thus, virtually prevents iron powder from sticking thereto. In addition, the detection surface is located above the dam 52 and ahead of the dam 52 in the direction of rotation of the second cam phase alteration mechanism 31. Thus, the dam 45 prevents the hydraulic oil possibly containing iron powder from reaching the detection surface 45 in the space 43, makes it unlikely that iron powder stays in front of the detection surface 45, and thus, prevents the second cam sensor 45's false detection.

As described above, in the present embodiment of engine 1, annular oil grooves 64, 73 are provided in the inner circumferential surface of the bearings 23a, 23e or the outer circumferential surface of the cam journals 63, 74 to allow the hydraulic oil to always flow between the intake camshaft 4 and the bearings 23a, 23e of the cylinder head 2 which are in relative rotation. Specifically, in the present embodiment of engine 1, an annular oil groove 64 to be connected to the oil passage 61 towards the first cam phase alteration mechanism 30 formed in the bearing 23a is formed in the outer circumferential surface of the cam journal 63, while an annular oil groove 73 to be connected to the oil passage 71 towards the second cam phase alteration mechanism 31 formed in the bearing 23e is formed in the inner circumferential surface of the bearing 23e. The flowability, or ease of the hydraulic oil's flowing into the annular oil grooves 64, 73 differs depending on whether the oil grooves 64,73 are formed in the stationary bearings 23a, 23e or the rotating cam journals 63, 74. Referring to figures numbered 8, the reason will be explained below.

Figure 8A:
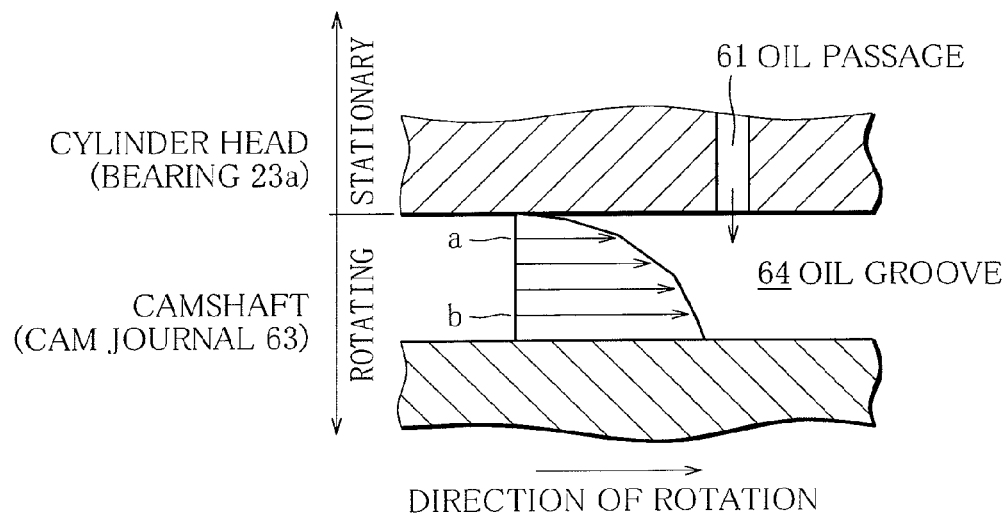
FIG. 8A is an explanatory diagram showing the circumferential velocity of an hydraulic oil in an oil groove formed in the camshaft.
Figure 8B:
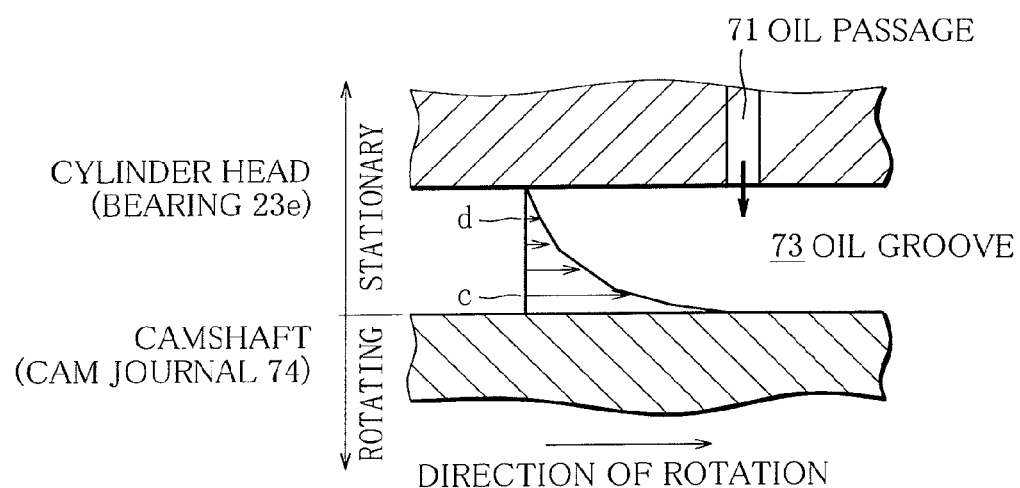
FIG. 8B is an explanatory diagram showing the circumferential velocity of the hydraulic oil in an oil groove formed in a cylinder head.
Figure 8C:
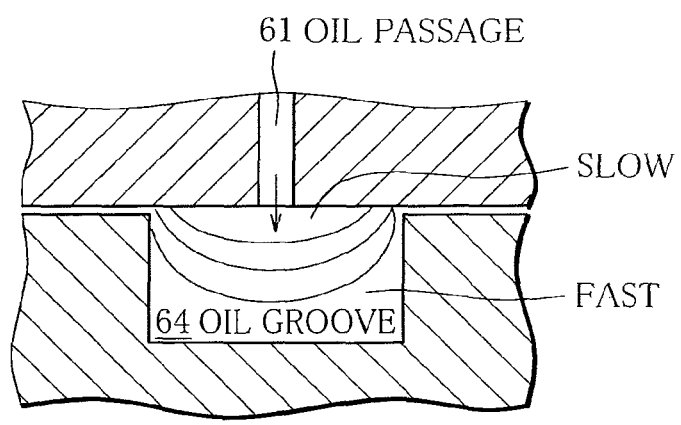
FIG. 8C is a cross-sectional view across the oil groove formed in the camshaft showing the circumferential-velocity distribution which the hydraulic oil exhibits therein.

Figures numbered 8 are explanatory diagrams showing the circumferential velocity of the hydraulic oil in the oil grooves 64, 73, where FIG. 8A relates to the oil groove 64 formed in the camshaft (cam journal 63), and FIG. 8B the oil groove 73 formed in the cylinder head (bearing 23e). In these figures, for ease of comparison, circumferential velocities are indicated linearly. FIG. 8C is a cross-sectional view across the oil groove 64 formed in the camshaft, and FIG. 8D a cross-sectional view across the oil groove 73 formed in the cylinder head, each showing velocity distribution in the oil groove.

In the annular oil groove 73 formed in the inner circumferential surface of the bearing 23e, only layers of the hydraulic oil nearer to the rotating camshaft rotate by being dragged by the rotating camshaft, and thus, the hydraulic oil slowly moves past the open end of the oil passage 71 extending into the oil groove 73 to constitute an oil path to the second cam phase alteration mechanism 71. This produces a difference between the pressures near the open ends of the oil passages extending into the oil grooves 73. Specifically, the pressure near the open end of the passage toward the second cam phase alteration mechanism 31 is lower than the pressure near the open end of the passage toward the first cam phase alteration mechanism 30, resulting in the hydraulic oil's being more easily supplied to the oil groove 73.

As shown in FIGS. 8A and 8C, in the annular oil groove 64 formed in the outer circumferential surface of the rotating camshaft (cam journal 63), also the hydraulic oil rotates by being dragged by the rotating oil groove 64, and thus, the hydraulic oil exhibits high circumferential velocities particularly near the groove wall (indicated by b in the drawings). In the annular oil groove 64, the hydraulic oil therefore moves past the open end of the oil passage 61 at relatively high circumferential velocities (indicated by a in the Figure).

Figure 8D:
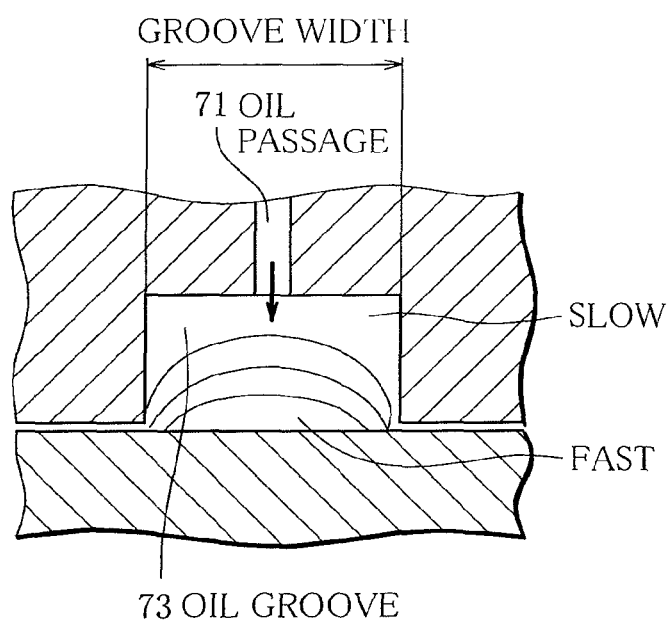
FIG. 8D is a cross-sectional view across the oil groove formed in the cylinder head showing the circumferential-velocity distribution which the hydraulic oil exhibits therein.
Figure 9A:
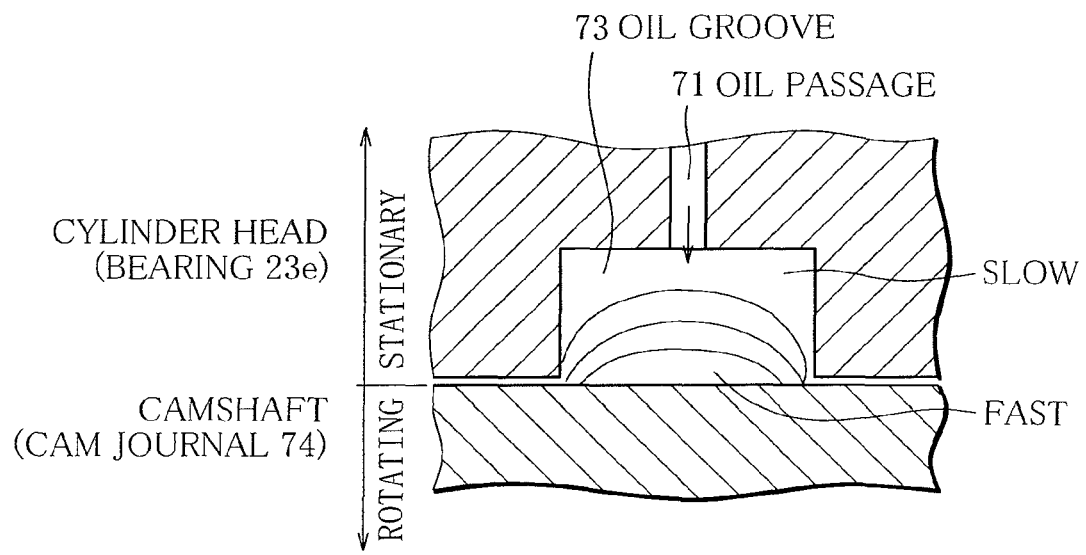
FIG. 9A is a cross-sectional view showing an example of how an oil passage is arranged to extend into the oil groove in the cylinder head.
Figure 9B:
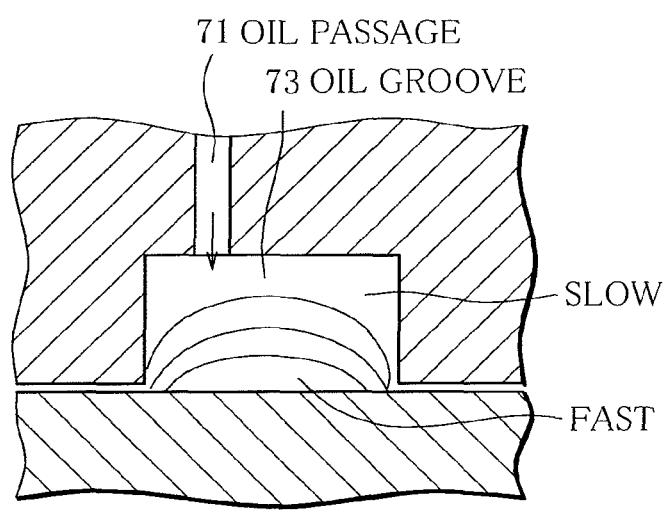
FIG. 9B is a cross-sectional view showing another example of how the oil passage is arranged to extend into the oil groove in the cylinder head.
Figure 9C:
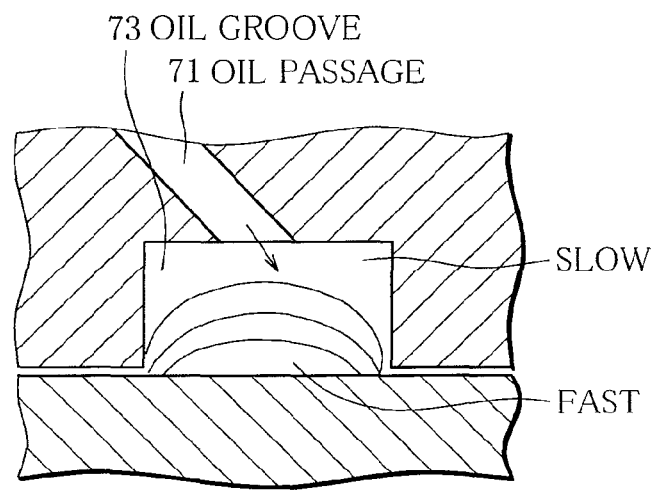
FIG. 9C is a cross-sectional view showing another example of how the oil passage is arranged to extend into the oil groove in the cylinder head.
Figure 9D:
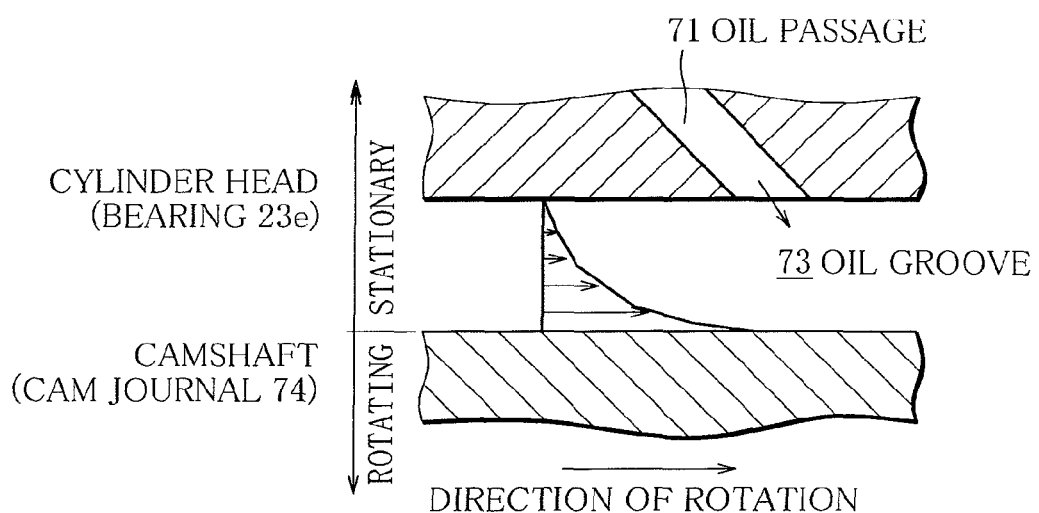
FIG. 9D is a cross-sectional view showing another example of how the oil passage is arranged to extend into the oil groove in the cylinder head.

By contrast, as shown in FIGS. 8B and 8D, in the oil groove 73 formed in the bearing 23e, a stationary part of the cylinder head 2, layers of the hydraulic oil nearer to the side opposite to the open end of the oil passage 71 rotate accompanying the rotating cam journal 74 because of its viscosity (indicated by c in the Figure), but layers of the hydraulic oil near the groove wall rotate little, and thus, exhibit relatively low circumferential velocities (indicated by d in the Figure). In the oil groove 73, the hydraulic oil therefore moves past the open end of the oil passage 71 at relatively low circumferential velocities (indicated by d in the Figure).

Difference between the circumferential velocities of the hydraulic oil near the open ends of the oil passages extending into the two oil grooves results in difference between the hydraulic pressures, which affects the ease of the hydraulic oil's flowing from the oil passages 61, 71 in the bearings 23a, 23e into the oil grooves 64, 73. Specifically, the oil groove 73 provided in the cylinder head 64, shown in FIGS. 8B and 8D, results in low oil pressure near the open end of the oil passage, and thus, ease of the hydraulic oil's flowing in, compared with the oil groove 64 provided in the camshaft, shown in FIGS. 8A and 8C. In the present embodiment designed such that the hydraulic oil is supplied to the second cam phase alteration mechanism 31 through the oil path including the oil groove 73 provided in the cylinder head 2, and supplied to the first cam phase alteration mechanism 30 through the oil path including the oil groove 64 provided in the intake camshaft 4, the hydraulic oil is supplied to the second cam phase alteration mechanism 31 in preference to the first cam phase alteration mechanism 30, leading to improved response of the second cam phase alteration mechanism 31 effecting split alteration.

Thus, even in low-load low-speed engine rotation entailing a reduction in supply of the hydraulic oil from the oil pump, for example, the second cam phase alteration mechanism 31 can alter the split with satisfactory responsiveness.

As seen from the above, in the present embodiment, the bearing 23e having the oil passage toward the second cam phase alternation mechanism 31 is greater in inside diameter than the bearing 23a having the oil passage toward the first cam phase alternation mechanism 30. The hydraulic oil therefore exhibits higher circumferential velocities, particularly a greater maximum circumferential velocity in the oil groove 73 than in the oil groove 64. In spite of exhibiting such greater maximum circumferential velocity, the hydraulic oil in the oil groove 73 exhibits, near the open end of the oil passage extending thereinto, low circumferential velocities, and thus, low pressure, resulting in ease of the hydraulic oil's flowing into the oil groove 73. Thus, ease of the hydraulic oil's being supplied to the second cam phase alteration mechanism 31 compared with the first cam phase alteration mechanism 30 is maintained. This allows the journal to have an increased diameter, provides increased design freedom, and thus, makes it possible to increase strength reliability, while maintaining high drivability and high fuel efficiency. Further, it is possible to regulate the oil pressures near the open ends of the oil passages extending into the oil grooves to balance the responsivenesses of the first and second cam phase alteration mechanisms 30 and 31, by modifying the arrangement of the oil groove formed in the cam journal.

In the present embodiment designed such that both the first and second cam phase alteration mechanisms 30, 31 are supplied with the hydraulic oil via the oil passage 34 located near the first cam phase alteration mechanism 30, the oil path from the oil pump to the first cam phase alteration mechanism 30 is shorter than the oil path from the oil pump to the second cam phase alteration mechanism 31, resulting in great pressure loss in the oil path to the second cam phase alteration mechanism 31 compared with the oil path to the first cam phase alteration mechanism 32 because of its greater overall length. However, this disadvantage with respect to the hydraulic oil supply is compensated for by the above-described ease of the hydraulic oil's being supplied to the second cam phase alteration mechanism 31, due to the different structures of the bearings 23a, 23e. A reduction in supply of the hydraulic oil can thus be avoided by arranging that the bearing having an oil path to a hydraulic device remoter from a hydraulic pressure source has a greater diameter. This provides increased design freedom with respect to how the oil pump, the first cam phase alteration mechanism 30 and the second cam phase alteration mechanism 31 should be arranged as well as how the oil paths should be arranged.

FIGS. 9A to 9D are cross-sectional views showing examples of how the oil passage 61 extending into the oil groove 73 provided in the cylinder head (bearing 23e) can be arranged.

As stated above, in the oil groove 74 provided in the cylinder head, only layers of the hydraulic oil nearer to the cam journal 74 rotate by being dragged by the rotating cam journal 74, and thus, the hydraulic oil slowly moves past the supply end (open end) of the passage 71 extending into the oil groove 73, resulting in ease of the hydraulic oil's being supplied from the oil passage 71 to the oil groove 73. Thus, freely setting the position at and the direction in which the hydraulic oil is supplied to the oil groove 73, as seen in FIGS. 9A to 9D, is not likely to cause a short supply of the hydraulic oil, leading to increased design freedom with respect to how the oil passage 71 and others should be arranged.

Figure 10:
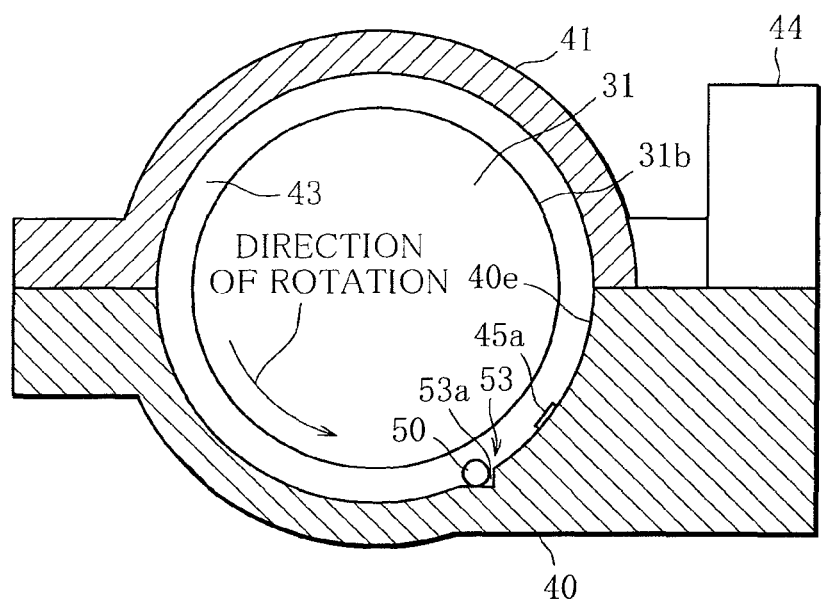
FIG. 10 is a cross-sectional view showing how a groove is provided in the actuator cover.

FIG. 10 is a structural diagram showing how a groove 93, another example of the guide means, is provided.

In the above-described embodiment, a dam 52 is provided at the inner circumferential wall surface of the actuator cover 40 as a guide means for guiding the hydraulic oil to the oil passage 50. Instead of the dam 52, a groove 53 may be provided as seen in FIG. 10. Similarly to the dam 52, the groove 52 slants upward from the rear wall 40f toward the cylinder head 2 with its cylinder head 2-side end 53a facing the oil passage 50.

Similarly to the dam 52, such groove easily guides the hydraulic oil present inside the actuator cover 40, which is stirred by the rotating second cam alteration mechanism 31, and thus helps the hydraulic oil be smoothly drained from the actuator cover 40 through the oil passage 50.

Although the described embodiment is designed such that the cylinder head cover 41 covers the upper half of the second cam phase alteration mechanism 31, it may be modified such that a member other than the cylinder head cover 41 covers the upper half of the second cam phase alteration mechanism 31.

Further, although the described embodiment comprises a first cam phase alteration mechanism 30 capable of altering the phase of all the first and second intake valves 9, 10, in addition to the second cam phase alteration mechanism 31 effecting so-called split alteration, or altering the phase offset between the first and second intake valves 9 and 10, the present invention is applicable to the engine comprising only the second cam phase alteration mechanism 31, in which case, the cam sprocket 6 may be fixed to the front end of the outer camshaft 21. Also in this case, arranging the second cam phase alteration mechanism 31 behind the cylinder head 2, and thus, outside the cylinder head 2 and covering it with the actuator cover 40 allows the cylinder head 2 to have a reduced front-to-back size, similarly to the described embodiment.

Further, although the described embodiment is an example in which the present invention is applied to an in-line three-cylinder engine with a DOHC valvetrain, the present invention is of course applicable to engines with a SOHC and engines with a different number of cylinders.

EXPLANATION OF REFERENCE NUMERALS

1: Engine
2: Cylinder head
2d: Oil drain passage
4: Intake camshaft
9: First intake valve 10: Second intake valve
23a, 23e: Bearing
30: First cam phase alteration mechanism
31: Second cam phase alteration mechanism
40: Actuator cover (cover member)
40h: Oil drain passage
41: Cylinder head cover
42: Second OCV (control valve)
45: Second cam sensor (detection means)
50: Oil passage
52: Dam (guide means)
53: Groove (guide means)
64, 73: Oil groove

The invention claimed is:

1. An engine equipped with a variable valvetrain including a cam phase alteration mechanism attached to a camshaft to alter the phase of a valve actuating cam fitted to the camshaft relative to a crankshaft, the camshaft being arranged to rotate by receiving power transmitted from the crankshaft to a first end of the camshaft, wherein
the cam phase alteration mechanism is arranged at a second end of the camshaft opposite to the first end to be located outside a cylinder head,
a cover member is fixed to the cylinder head to cover at least a lower portion of the cam phase alteration mechanism, and
a wall separating a space in the cover member and a space in the cylinder head has first oil path connecting the space in the cover member and the space in the cylinder head.

2. The engine equipped with the variable valvetrain according to claim 1, wherein
the cam phase alteration mechanism is a hydraulic actuator, and
a control valve for controlling supply and discharge of a hydraulic oil to and from the cam phase alteration mechanism is fixed to the cover member.

3. The engine equipped with the variable valvetrain according to claim 2, wherein an oil drain passage for draining the control valve extends into the cylinder head.

4. The engine equipped with the variable valvetrain according to claim 3, wherein
the cam phase alteration mechanism has a cylindrical outer shape and is arranged coaxially with the camshaft, and
the cover member has an arc-shaped inner wall surface extending along an outer circumference of the cam phase alteration mechanism.

5. The engine equipped with the variable valvetrain according to claim 2, further comprising:
another cam phase alteration mechanism, wherein
the cam phase alteration mechanism and the another cam phase alteration mechanism are provided at opposite ends either end of the camshaft rotatably supported by plural bearings formed integrally with the cylinder head,
the cam phase alteration mechanism has having the first oil path and the another cam phase alteration mechanism has a second oil path, each oil path having first and second oil passages, each first oil passage being formed in the camshaft, each second oil passage being formed in the cylinder and extending in different ones of the bearings and connecting to the first oil passage of the corresponding oil path, and
the first oil path supplying hydraulic oil to the cam phase alteration mechanism includes an annular groove formed in an inner circumferential surface of the bearing, and the second oil path supplying hydraulic oil to the another cam phase alteration mechanism includes an annular groove formed in an outer circumferential surface of the camshaft.

6. The engine equipped with the variable valvetrain according to claim 5, wherein
the engine has a plurality of intake valves for each cylinder,
the another cam phase alteration mechanism is provided to alter a phase of all the intake valves, and the cam phase alteration mechanism is provided to alter a phase of some of the intake valves.

7. The engine equipped with the variable valvetrain according to claim 6, wherein the bearing having the oil passage constituting the oil path to the cam phase alteration mechanisms is greater in inside diameter than the bearing having the passage constituting the oil path to the another cam phase alteration mechanisms.

8. The engine equipped with the variable valvetrain according to claim 2, wherein
the cylinder head and the cover member are open at the top,
the cover member is arranged with its open top flush with the open top of the cylinder head, and
the engine comprises a cylinder head cover arranged to cover the open top of the cylinder head and the open top of the cover member.

9. The engine equipped with the variable valvetrain according to claim 2, wherein a detection device that detects a phase of a cam subjected to phase alteration control through the cam phase alteration mechanism is fitted to the cover member.

10. The engine equipped with the variable valvetrain according to claim 2, wherein
the cam phase alteration mechanism has a cylindrical outer shape and is arranged coaxially with the camshaft, and
the cover member has an arc-shaped inner wall surface extending along an outer circumference of the cam phase alteration mechanism.

11. The engine equipped with the variable valvetrain according to claim 1, wherein
the cylinder head and the cover member are open at the top,
the cover member is arranged with its open top flush with the open top of the cylinder head, and
the engine comprises a cylinder head cover arranged to cover the open top of the cylinder head and the open top of the cover member.

12. The engine equipped with the variable valvetrain according to claim 11, wherein
the cover member is open at the top and has an interior space in the shape of a half cylinder to cover a lower half of the cam phase alteration mechanism, and
the cylinder head cover has an arc-shaped inner wall surface extending along an outer circumference of the cam phase alteration mechanism and covers the open top of the cover member.

13. The engine equipped with the variable valvetrain according to claim 11, wherein a detection device that detects a phase of a cam subjected to phase alteration control through the cam phase alteration mechanism is fitted to the cover member.

14. The engine equipped with the variable valvetrain according to claim 11, wherein
the cam phase alteration mechanism has a cylindrical outer shape and is arranged coaxially with the camshaft, and
the cover member has an arc-shaped inner wall surface extending along an outer circumference of the cam phase alteration mechanism.

15. The engine equipped with the variable valvetrain according to claim 1, wherein the cam phase alteration mechanism has a cylindrical outer shape and is arranged coaxially with the camshaft, and the cover member has an arc-shaped inner wall surface extending along an outer circumference of the cam phase alteration mechanism.

16. The engine equipped with the variable valvetrain according to claim 15, wherein the cover member has a guide device provided at the arc-shaped inner wall surface to guide the hydraulic oil from the space in the cover member to the oil passage as the cam phase alteration mechanism rotates.

17. The engine equipped with the variable valvetrain according to claim 1, wherein the cover member is a member separate from the cylinder head and fixed to the cylinder head.

18. The engine equipped with the variable valvetrain according to claim 1, wherein a detection device for detecting the phase of cam subjected to phase alteration control through the cam phase variation mechanism is fitted to the cover member.

19. The engine equipped with the variable valvetrain according to claim 18, wherein the cam phase alteration mechanism has a cylindrical outer shape and is arranged coaxially with the camshaft, and the cover member has an arc-shaped inner wall surface extending along an outer circumference of the cam phase alteration mechanism.

\* \* \* \* \*